June 13, 1961 F. F. LINDSTAEDT 2,988,157
CULTIVATOR
Filed Nov. 26, 1957 2 Sheets-Sheet 1
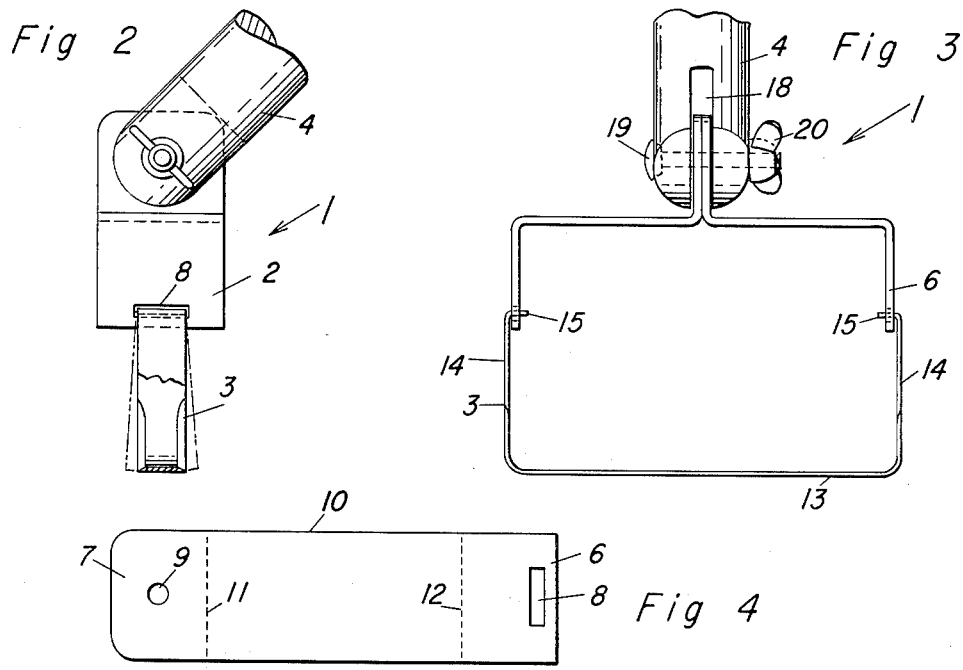
INVENTOR.
Frank F. Lindstaedt
BY A. Schapp
Att'y

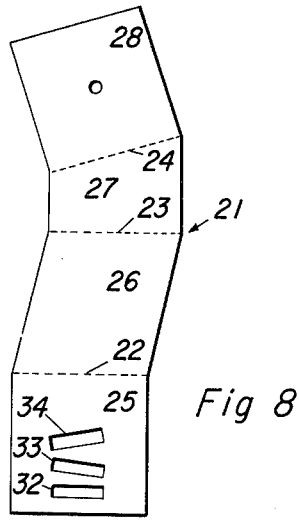
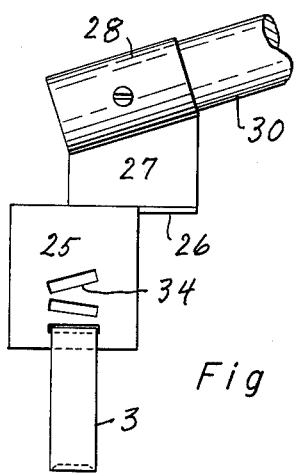
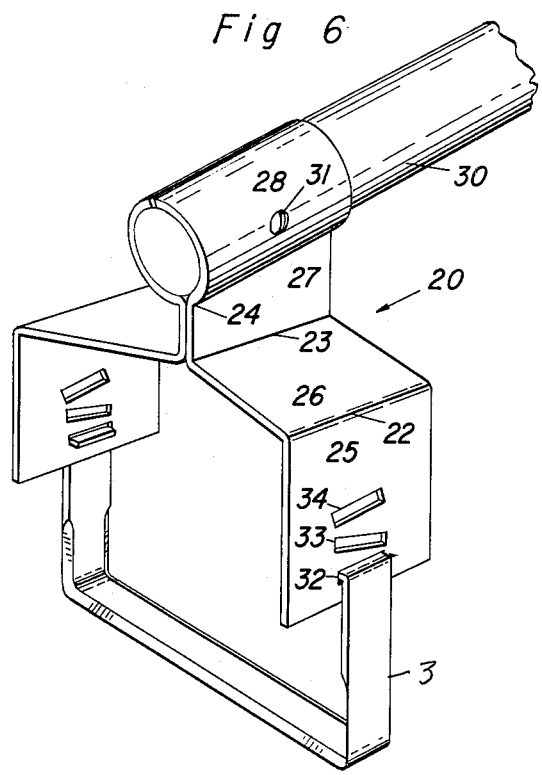
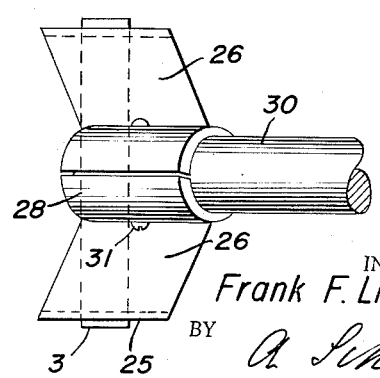

United States Patent Office 2,988,157
Patented June 13, 1961

2,988,157
CULTIVATOR
Frank F. Lindstaedt, 109 Fawn Drive,
San Anselmo, Calif.
Filed Nov. 26, 1957, Ser. No. 699,000
3 Claims. (Cl. 172—376)

The present invention relates to improvements in cultivators, and its principal object is to provide a cultivator adapted for attachment to a conventional hoe handle or rake handle, and operable for slicing a relatively thin slice of the top of the soil for weeding purposes and for the general purpose of breaking up and improving the texture of the soil surface.

A further object of my invention is to provide a cultivator of the character described that is double-acting in the sense that it will slice off a top layer of the soil on a rearward stroke as well as on the forward stroke.

For this purpose, it is proposed to provide a tiltable blade, sharpened on both sides and mounting means for the same arranged in such a manner that the blade will automatically adjust itself to a desired angle on opposing strokes.

It is still further proposed to arrange the sharpened edges in such a manner that the soil, while being cut with one of the edges, discharges over the other edge and tends to automatically sharpen the latter.

More particularly, it is proposed to provide mounting means for the blade arranged in such a manner as to automatically effect the desired tilting on forward and rearward strokes, the mounting means allowing of quick attachment and detachment for replacement purposes and providing substantially continuous and flat side faces allowing the blade to be brought up close to an existing structure, such as the wall of a house, a fence, or the like.

Additionally, it is proposed to provide a cultivator of the character described which is convenient to handle, simple in construction, compact, cuts a uniform slice of top soil, and in which the handle is adjustable to different angles to suit the size of the operator.

And finally, it is proposed in a modified form of my invention, to provide a plurality of anchoring means for the blade for optional use by the operator with a view of providing a plurality of tilting ranges suitable for effective operation by persons of different heights.

Further objects and advantages of my invention will appear as the specification proceeds, and the new and useful features of my cultivator will be fully defined in the claims hereto attached.

The preferred forms of my invention are illustrated in the accompanying drawings, forming part of this application, in which:

FIGURE 1 shows a perspective view of my cultivator, with the handle detached;

FIGURE 2, a side view of the same, with the handle in position;

FIGURE 3, a front view of the same;

FIGURE 4, a plan view of a strap adapted for use in the manufacture of the supporting frame of my cultivator;

FIGURE 5, a plan view of a spring steel blank adapted for use in the manufacture of the cutting blade of my cultivator;

FIGURE 6, a perspective view of a modified form of my invention;

FIGURE 7, a side view of the same;

FIGURE 8, a plan view of a blank used in the manufacture of the frame of the modified form; and FIGURE 9, a plan view of the device of FIGURES 6 and 7.

While I have shown only the preferred forms of my invention, it should be understood that various changes or modifications may be made within the scope of the claims attached hereto, without departing from the spirit of the invention.

Referring to the drawings in detail, my cultivator 1 comprises, in its principal features, a frame 2, a blade 3, secured upon the frame with limited freedom of tilting movement, and a handle 4 adjustably secured upon the frame.

The frame is generally U-shaped and comprises a flat horizontal portion 5, a pair of legs 6 depending from the ends thereof and a pair of flanges 7 rising vertically from the central portion thereof and secured upon one another. The lower ends of the legs are formed with horizontal slots 8 approximately three-quarter inch long and one-quarter or three-sixteenths of an inch in width, and the flanges are formed with registering central holes 9 used in the attachment of the handle 4.

For convenience in manufacturing, the frame is preferably made of two identical straps 10, which may be used interchangeably. One of these straps is shown in FIGURE 4, and may be approximately six inches long and two inches wide. The strap is formed with the slot 8 near one end thereof and the hole 9 in the other end, and is suitably bent along lines 11 and 12 to form the leg 6 and the flange 7.

The bends 11 and 12 are preferably located to leave a central portion three inches in length, while the leg and the flange are one and one-half inches each.

Two of the finished straps may be readily joined by placing the flanges 7 in adjacent relation and welding them together, which automatically lines up the holes 9 and the slots 8.

The blade 3 is made of a continuous strip of spring metal bent to present an intermediate section 13 approximately six inches long, and two arms 14 extending upwardly from the ends of the intermediate section to straddle the legs of the frame 2.

The extremities of the arms are turned inwardly to present short flanges 15 for catching in the slots 8 under spring pressure inherent in the blade material.

The blade is of uniform width, preferably three-quarter inch, and the flanges 15 correspond in width to the length of the slots 8.

The thickness of the blades and of the flanges is approximately one-sixteenth of an inch and the width of each slot is somewhat in excess of this thickness, say, one eighth or even three-sixteenths of an inch, so as to allow of a slight tilting motion of each flange in its slot and of a corresponding tilting motion of the blade with respect to the frame.

The degree of tilting movement allowed depends upon the clearance of the slots, and should be only a few degrees, as illustrated in dotted lines in FIGURE 3.

The blade is preferably made of a single strip of spring steel 16, illustrated in FIGURE 5, the strip being approximately ten inches long and having opposing edges sharpened on a downward taper, as at 17, through the major intermediate portion of its length. It is then bent into the form shown in FIGURE 3 in such a manner that the sharpened edges extend well into the arms 14, so as to clearly define the side edges of the slice to be cut by the blade.

The handle 4, which may be in the nature of the conventional hoe handle, is slit at its end, as at 18, to fit over the two flanges 7, and is secured to the flanges by means of a bolt 19 and a wing nut 20. It may be readily adjusted to any suitable angle upon loosening of the wing nut, and any suitable friction means may be used to lock the handle in adjusted position.

In use:

The operator, with the handle adjusted to the proper angularity, merely pushes the blade forward over the ground surface which causes the blade to tilt backward for the sharp forward edge to dig into the ground surface to a limited depth and to slice off an upper layer of the top soil.

On a retracting movement, the blade automatically swings into the opposite direction, causing the rear edge to tilt downwardly for similar cutting action.

In either case, the soil cut by one edge will pass over the blade and the opposite edge with a tendency to sharpen the latter.

It will be noted that the manner of anchoring the blade to the frame leaves the outerfaces of the cultivator practically unobstructed so that the tool may be run directly alongside of and close to a house or a fence or any similar structure.

Removal of the blade and insertion of a new one is extremely simple. For removal of the blade, the operator merely pulls one of the flanges 15 out of its slot and then pushes the opposite flange out of its slot. The insertion of a new blade is then readily accomplished by merely inserting one of the flanges into one of the slots, then guiding the other flange to a point opposite the other slot and allowing the flange to spring into the slot.

In case it is desired to employ my cultivator as a small hand tool to be used while stooping or kneeling, it is only necessary to substitute a short handle for the conventional hoe handle.

A modified form of my invention is illustrated in FIGURES 6, 7 and 8, in which the frame 20 is made of two blanks 21, one of which is illustrated in FIGURE 8. Each of the blanks is bendable about lines 22, 23 and 24 to present a vertical leg section 25, a horizontal section 26, a second vertical section 27 and an inclined section 28 adapted for curving into a semi-circle about the handle 30.

The shaped blanks are shown as applied to the handle in FIGURES 6 and 7, and the same numerals have been applied. The two semi-circular sections are secured upon the handle by means of a bolt extending through registering holes 31.

In this form of my invention, the leg sections 25 are formed with three slots 32, 33 and 34, corresponding to the slots 8 of the first form, and these slots are arranged at different angles with respect to the bottom edge of the leg.

The lower slots 32 may run substantially parallel to said bottom edge, as do the slots 8, and when these slots are used for insertion of the short flanges 15 of the blade 3, the latter will normally occupy a vertical position, with the swinging angles in both directions being substantially the same.

The angle between the frame and the handle is selected with a view of causing a man of ordinary height to hold the frame normally in vertical position, so that as he pushes and pulls the tool in alternate forward and backward movements, the swinging movement of the blade will be through substantially the same angle with respect to the vertical plane of the frame.

But, if the tool were used by a taller person, who would hold the handle at a steeper angle with respect to the ground surface, he would normally tilt the frame with respect to the blade, with the result that the flange would assume a tilted position with respect to the slot in midway position, and as a result, would tilt unevenly on forward and backward strokes.

To guard against this, the operator would use the intermediate slots 33 as anchoring means for the blade flanges, thus insuring even forward and backward swinging motion of the blade from a midway position.

In the same manner a short person would preferably use the third slot 34 in order to parallel the slot with the flange in midway position.

It is apparent that this slot arrangement may be readily transferred to the form shown in FIGURES 1 to 5, inclusive, as a substitute of, or in combination with the adjustable handle.

I claim:

1. In a double-acting cultivating tool, a frame having a pair of depending legs, a handle attached to the frame on such an incline as to normally hold the legs in vertical position when the tool is in use, each of said legs having an elongated horizontal slot in the lower end thereof positioned in the leg so that one slot is horizontally alined with the other, and a cultivating blade having a pair of ascending arms adapted for straddling the legs and formed with transverse flanges engaging in said slots, said flanges having a vertical thickness a substantial amount smaller than the minimum height of said slots so as to allow a limited rocking movement of said flanges in said slots.

2. In a double-acting cultivating tool, a frame having a pair of depending legs, a handle attached to the frame on such an incline as to normally hold the legs in vertical position when the tool is in use, each of said legs having an elongated horizontal slot in the lower end thereof positioned in the leg so that one slot is horizontally alined with the other, and a cultivating blade having a pair of ascending arms adapted for straddling the legs and formed with transverse flanges engaging the said slots, said flanges having a vertical thickness a substantial amount smaller than the minimum height of said slots so as to allow a limited rocking movement of said flanges in said slots, said legs being formed with additional pairs of slots in horizontal alinement with each other for selective engagement by said flanges and arranged at different angularities with respect to said first-named slots whereby selected pairs of slots will be brought into horizontal position when the handle is operated at different angularities with respect to the ground.

3. In a double-acting cultivating tool, a frame having a pair of depending legs, a handle attached to the frame on such an incline as to normally hold the legs in vertical position when the tool is in use, each of said legs having an elongated horizontal slot in the lower end thereof positioned in the leg so that one slot is horizontally alined with the other, and a cultivating blade having a pair of ascending arms adapted for straddling the legs and formed with transverse flanges engaging in said slots, said slots being formed with parallel sides spaced apart by a distance exceeding the vertical thickness of said flanges so as to allow limited vertical and rocking movement of said flanges in said slots.

References Cited in the file of this patent

UNITED STATES PATENTS

| | | |
|---|---|---|
| 1,228,935 | Lilpakka | June 5, 1917 |
| 1,454,326 | Madson | May 8, 1923 |
| 2,539,351 | Gress | Jan. 23, 1951 |
| 2,741,969 | Strecker | Apr. 17, 1956 |

FOREIGN PATENTS

| | | |
|---|---|---|
| 242,909 | Great Britain | Nov. 19, 1925 |